United States Patent [19]

Sekiya et al.

[11] 3,930,186
[45] Dec. 30, 1975

[54] PROTECTIVE DEVICE FOR BRUSHLESS DC MOTOR

[75] Inventors: Tetsuo Sekiya, Yokohama; Atsushi Hienuki, Sendai, both of Japan

[73] Assignee: Sony Corporation, Tokyo, Japan

[22] Filed: June 26, 1974

[21] Appl. No.: 483,153

[30] Foreign Application Priority Data
June 29, 1973  Japan............................. 48-78240[U]

[52] U.S. Cl. ............ 317/13 B; 317/40 R; 310/68 C; 318/471; 323/89 M; 323/89 P; 323/89 T
[51] Int. Cl.² ....................... H02H 7/08; H02H 5/04
[58] Field of Search .... 317/13 B, 13 A, 13 R, 40 R; 310/68 C, 68 D, 72, 68 R, 68 B; 318/471, 472, 473, 439, 440, 441; 323/89 M, 89 P, 89 T, 68, 70

[56] References Cited
UNITED STATES PATENTS

| | | |
|---|---|---|
| 2,350,329 | 6/1944 | Hornfeck ........................... 323/70 X |
| 2,575,922 | 11/1951 | Langenwalter..................... 310/68 C |
| 2,637,823 | 5/1953 | Anderson et al. ................. 323/68 X |
| 3,505,579 | 4/1970 | Leenhouts et al. .............. 318/440 X |
| 3,614,593 | 10/1971 | Lace .................................... 310/72 |
| 3,619,746 | 11/1971 | Thornton et al..................... 318/439 |
| 3,714,532 | 1/1973 | McCurry............................... 318/439 |

*Primary Examiner*—J. D. Miller
*Assistant Examiner*—Patrick R. Salce
*Attorney, Agent, or Firm*—Hill, Gross, Simpson, Van Santen, Steadman, Chiara & Simpson

[57] ABSTRACT

A protective device for a brushless DC motor is disclosed in which a high frequency signal is applied through a transformer to a coil for detecting the rotary position of the rotor of the motor. In this case, the magnetic core of the transformer is made of thermosensitive or temperature-sensitive ferrite and the rotation of the motor is stopped when an abnormal heat is generated by detecting the abnormal heat with the magnetic core.

6 Claims, 4 Drawing Figures

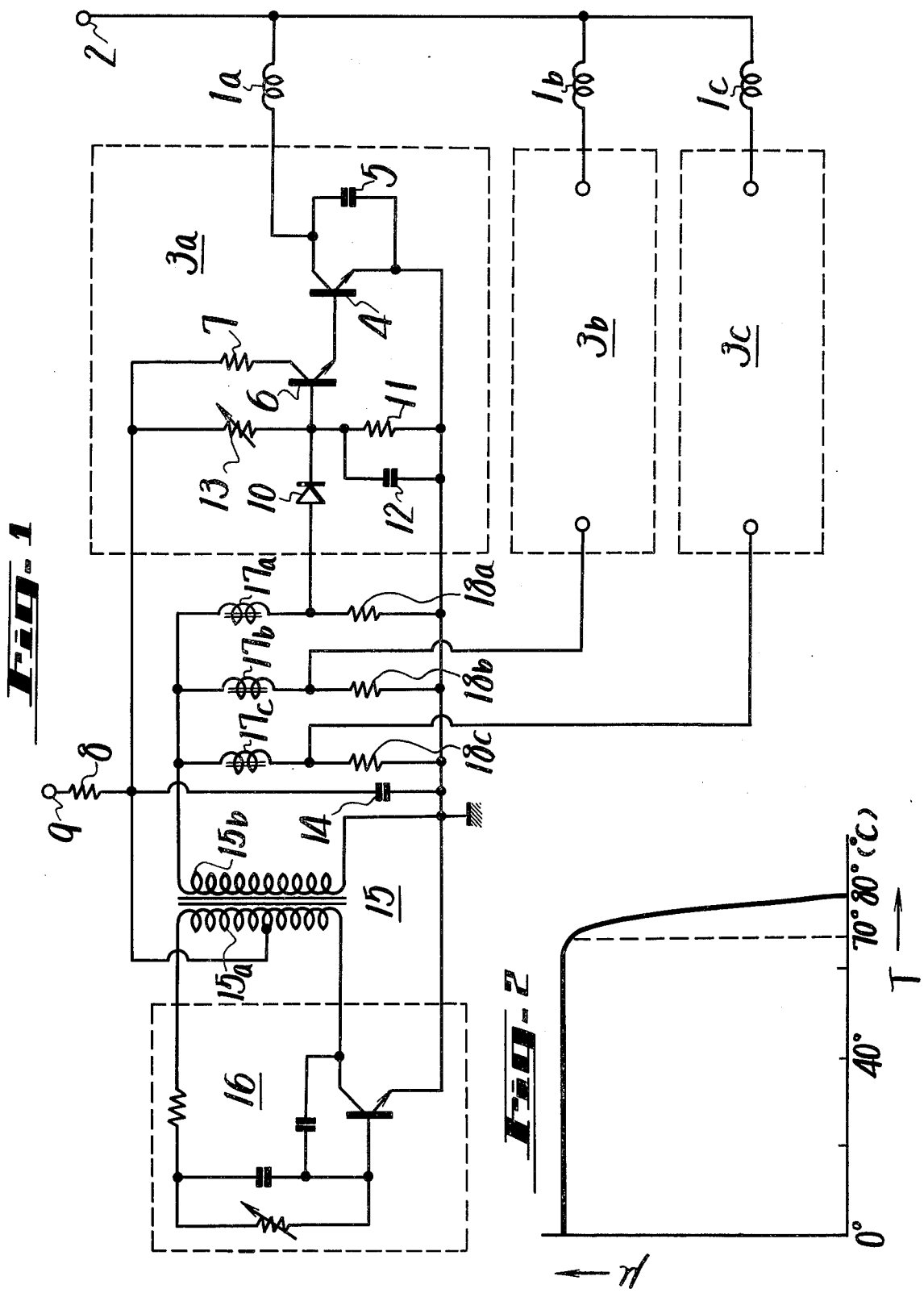

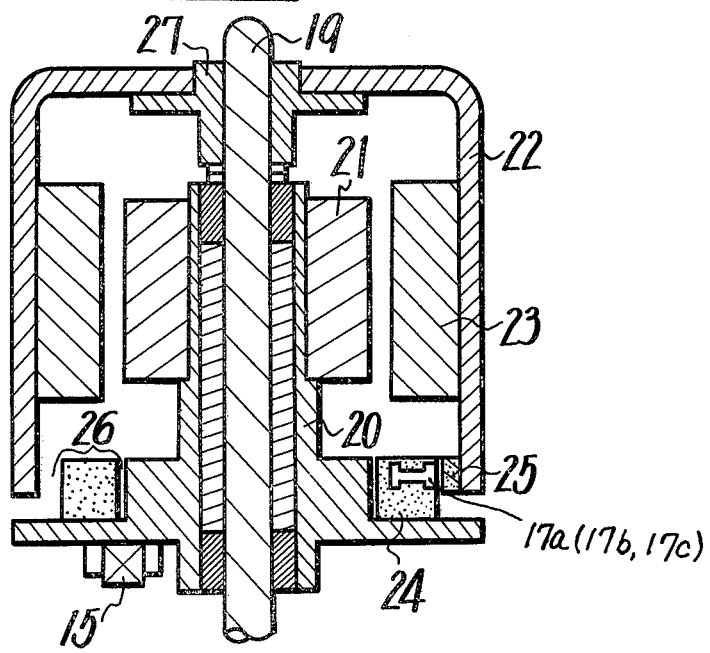
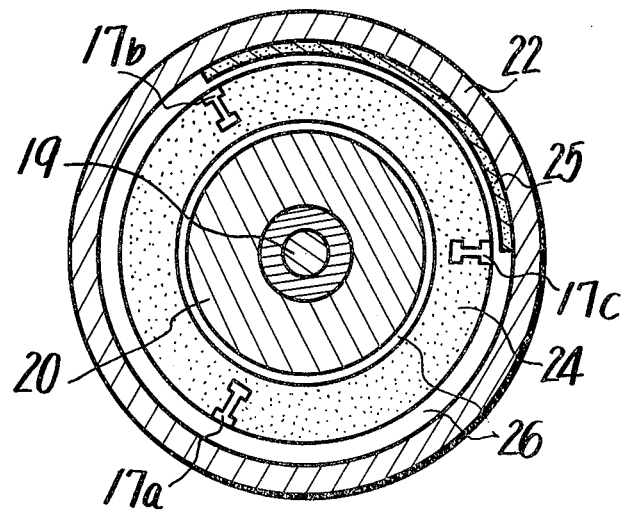

PROTECTIVE DEVICE FOR BRUSHLESS DC MOTOR

BACKGROUND OF THE INVENTION

1. Field of the Invention

The present invention relates generally to a protective device for a brushless DC motor, and more particularly is directed to a protective circuit for a brushless DC motor with which a brushless DC motor can be driven by a voltage exceeding a rated voltage in a short time period.

2. Description of the Prior Art

In a prior art brushless DC motor using a rotor made of a permanent magnet, the magnet has a large mass and, its inertial mass is large in a brushless DC motor with the type of an outer-rotor groove construction. When such a brushless DC motor is employed in a sound instrument and the like, its great inertial mass generally serves to reduce unevenness in rotation but, on the contrary, a relatively long time period is required for the brushless DC motor to come up to its normal speed due to its great inertial mass. Since the brushless DC motor is provided not with contact mechanisms such as a brush, a commutator and so on, there is no element to restrict the starting current for the motor to increase the motor's life except a transistor for electrical power. In order to eliminate the defect of the prior art mentioned above, it is sufficient that the motor be driven by the excessive current only during starting so as to shorten the starting time period. However, if the motor is driven so as to exceed its rating for a short time period due to carelessness in use or the like, there is a risk that heat will be generated in the transistor for electrical power and the brushless DC motor itself may be destroyed or fires and the like may be caused.

SUMMARY OF THE INVENTION

According to the present invention, there is provided a brushless DC motor in which a high frequency signal is applied to a detecting coil for detecting a rotary position of the rotor of the motor through a transformer and in which the magnetic core of the transformer is formed of a thermo-sensitive or temperature-sensitive ferrite to protect the motor by stopping it when excessive heat is generated therein.

It is, accordingly, an object of the present invention to provide a protective device for a brushless DC motor free from the defects encountered in the prior art.

It is another object of the invention to provide a protective device for a brushless DC motor in which even if an excessive current greater than rated flows in the motor for a short time period, the motor will not be damaged and fire will not occur.

The other objects, features and advantages of the invention will become apparent from the following description taken in conjunction with the accompanying drawing.

BRIEF DESCRIPTION OF THE DRAWING

FIG. 1 is a connection diagram showing an embodiment of the protective device for a brushless DC motor according to the present invention;

FIG. 2 is a graph used for explaining the protective device of the invention;

FIG. 3A is a longitudinal cross-sectional view showing the construction of the invention; and FIG. 3B is a transverse cross-sectional view thereof.

DESCRIPTION OF THE PREFERRED EMBODIMENT

An embodiment of the protective device for a brushless DC motor according to the present invention will be hereinafter described with reference to the drawings.

In FIG. 1, reference numerals 1a, 1b and 1c indicate exciting windings, respectively, one ends of which are connected together to a voltage source terminal 2 supplied with a DC voltage. The exciting windings 1a, 1b and 1c are wound on a stator (not shown) at a predetermined angular distance, for example, 120°. The free end of the exciting winding 1a is connected to the collector electrode of an NPN-type transistor 4 for power amplification of a driving circuit 3a. A capacitor 5 is connected in the collector-emitter path of the transistor 4 whose emitter electrode is grounded and whose base electrode is connected to the emitter electrode of an NPN-type transistor 6 for switching. The collector electrode of the transistor 6 is connected through a series connection of resistors 7 and 8 to a voltage source terminal 9, while the base electrode of the transistor 6 is connected to the cathode electrode of a diode 10. The connection point between the transistor 6 and the diode 10 is grounded through a parallel connection of a resistor 11 and a capacitor 12, and also connected through a variable resistor 13 to the connection point between the resistors 7 and 8. Other driving circuits 3b and 3c are substantially same as the driving circuit 3a in construction, so that their description will be omitted. The above circuit construction is substantially similar to that of the prior art one for a brushless DC motor.

In the present invention, as shown in FIG. 1, the voltage source terminal 9 is connected through a series connection of the resistor 8 and a capacitor 14 to a common terminal or ground terminal and the connection point between the resistor 8 and the capacitor 14 is connected to a mid-tap of a primary winding 15a of a transformer 15. One end of the primary winding 15a is connected to one terminal of an oscillator 16 and the other end of the primary winding 15a is connected to the other end of the oscillator 16. One end of a secondary winding 15b of the transformer 15 is connected to the ground terminal through a series connection of a detecting coil 17a and a resistor 18a, a series connection of a detecting coil 17b and a resistor 18b, and through a series connection of a detecting coil 17c and a resistor 18c, respectively, while the other end of the secondary winding 15b of the transformer 15 is connected to the ground terminal directly. The connection points between the detecting coils 17a to 17c and the resistors 18a to 18c are connected to the diodes 10 in the driving circuits 3a to 3c (though in the driving circuit 3b and 3c, the diodes 10 are not shown), respectively. In the embodiment of the invention shown in FIG. 1, the magnetic core of the transformer 15 is made of a thermo-sensitive or temperature-sensitive ferrite which has a temperature-permeability characteristic shown by a curve in the graph of FIG. 2 from which it may be apparent that the permeability $\mu$ (in the ordinate) decreases abruptly at the temperatures T (in the abscissa) of 70°C.

A practical embodiment of the brushless DC motor with the protective device constructed as above is shown in FIGS. 3A and 3B in longitudinal and transverse cross-sections, respectively. In the figures, reference numeral 19 designates a rotary shaft of the motor, 20 a base for a stator of the motor and 21 the stator, respectively. The stator 21 is supported by the base 20. A cup-shaped rotor 22 having fixed thereto a permanent magnet 23 at its inside is rotatably supported by the rotary shaft 19 through a bearing 27 to surround the stator 21. A ring-shaped support 24 made of resin such as bakelite is mounted on the base 20 inside the cup-shaped rotor 22 for holding the detecting coils 17a, 17b and 17c at predetermined positions or angular distance of 120° as shown in FIG. 3B. A marker magnet 25 made of, for example, rubber is attached to the inner surface of the cup-shaped rotor 22 at the position opposing the detecting coils 17a, 17b and 17c in the support 24. In this case, as shown in FIG. 3B, the marker magnet 25 is formed to have an angular distance of about 120°. The transformer 15 is mounted on the motor near the position where heat may be generated or on the base 20 which is heated in association with the heat generated in the stator 21, as shown in FIG. 3A. In FIGS. 3A and 3B reference numerals 26 show gaps formed between the base 20 and support 24, and between the support 24 and the rotor 22.

With the brushless DC motor constructed as above, as the rotor 22 is rotated, the detecting coils 17a, 17b and 17c are excited by the marker magnet 25 as the rotor 22 is rotated, which will indicate the rotary position of the rotor 22, successively, and hence the permeability of the coils 17a, 17b and 17c is changed, successively, to thereby control the supply of signals to the driving circuits 3a, 3b and 3c from the transformer 15, respectively, and to rotate the motor. That is, when the signal is applied to the driving circuits, this signal is applied through the diode 10 to the base electrode of the transistor 6 to make the same conductive and hence the base electrode of the transistor 4 is supplied with a bias current to be made conductive. Thus, the DC current from the voltage terminal 2 flows through one of the exciting windings 1a, 1b and 1c and through one of the transistors 4 to the ground, and accordingly a torque is generated in the motor to rotate the same.

In the case where the brushless DC motor with the protective device according to the present invention is driven by an excessive current exceeding a rated current in a short time period, if abnormal heat is generation caused by the excessive current in the motor and transistors, the abnormal heat generated is detected by the magnetic core, formed of the specific material mentioned above, of the transformer 15 or the temperature-sensitive ferrite. At such time, the permeability of the temperature-sensitive ferrite decreases as shown in the graph of FIG. 2 and the magnetic coupling of the transformer 15 decreases. Thus, no high frequency signals are applied to the detecting coils 17a, 17b and 17c, respectively, and, as a result, no switching signals are applied to the driving circuits 3a, 3b and 3c, respectively. Thus, the transistors in the driving circuits 3a, 3b and 3c are not made conductive and hence the motor is not rotated. Therefore, the motor will not be destroyed by the abnormally generated heat and fires will not occur, and consequently the motor can be safely driven with an excessive current exceeding the rated current for a short time period.

With the present invention, as described above, the transformer 15 is mounted on the part near the stator of the motor or the like as shown in FIG. 3A where heat may be generated and the magnetic core of the transformer 15 is made of, for example, temperature-sensitive ferrite whose permeability is changed or decreased abruptly at the temperature of about 70°C, so that even if an abnormal current exceeding the rated current flows through the motor for a short time period, the magnetic core made of temperature-sensitive ferrite detects heat generated in the stator, transistors and the like to stop the driving of the motor. Thus, the motor can be driven with excessive current exceeding the rated current without damage to the motor and without the generation of fires and so on.

Although the above description is given on the preferred embodiment of the present invention only, it will be apparent that many modifications and variations could be effected without departing from the spirits and scope of the novel concepts of the invention.

We claim as our invention:

1. A brushless electrical motor including,
a permanent magnet rotor,
a stator rotatably supporting said rotor and a plurality of angularly spaced field windings mounted in said stator, position sensing means mounted on said rotor, a plurality of detecting coils mounted to sense the angular position of said sensing means,
a plurality of electronic switches respectively connected in series with said plurality of field windings and having control electrodes respectively connected to said plurality of detecting coils, first voltage supply terminals connected across said plurality of field windings and electronic switches,
an oscillator,
a transformer having a temperature sensitive magnetic core with its primary winding connected to the output of said oscillator and its secondary connected across each of said detecting coils such that power is sequentially applied to said field windings as said rotor rotates at temperatures below a predetermined temperature but power is disconnected from said field windings by said electronic switches and transformer above said predetermined temperature.

2. A brushless electrical motor according to claim 1 wherein said electronic switches comprise transistors.

3. A brushless electrical motor according to claim 2 including a plurality of diodes respectively connected between said plurality of detecting coils and said control electrodes of said transistors.

4. A brushless electrical motor according to claim 2 wherein said magnetic core of said transformer is made of material which has an abrupt change in permeability at said predetermined temperature.

5. A brushless electrical motor according to claim 4 wherein said magnetic core is made of fervite.

6. A brushless electrical motor according to claim 4 wherein said predetermined temperature is about 70° centigrade.

* * * * *